United States Patent
Happonen et al.

(10) Patent No.: US 9,325,716 B2
(45) Date of Patent: Apr. 26, 2016

(54) METHOD, APPARATUS AND COMPUTER PROGRAM FOR ENABLING ACCESS TO REMOTELY STORED CONTENT

(75) Inventors: Aki Petri Happonen, Kiminki (FI); Hannu Vilpponen, Tampere (FI); Henrik Stefan Markus Hakala, Tampere (FI); Timo Yli-Pietila, Tampere (FI); Mikko Antero Nurmi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1962 days.

(21) Appl. No.: 12/346,499

(22) Filed: Dec. 30, 2008

(65) Prior Publication Data

US 2010/0169955 A1    Jul. 1, 2010

(51) Int. Cl.
| | |
|---|---|
| *G06F 7/04* | (2006.01) |
| *H04L 29/06* | (2006.01) |
| *G06F 3/01* | (2006.01) |
| *G06F 21/10* | (2013.01) |
| *G06F 21/32* | (2013.01) |

(Continued)

(52) U.S. Cl.
CPC .............. *H04L 63/101* (2013.01); *G06F 3/01* (2013.01); *G06F 21/10* (2013.01); *G06F 21/105* (2013.01); *G06F 21/32* (2013.01); *G06F 21/6218* (2013.01); *H04L 63/104* (2013.01); *G06F 2221/2141* (2013.01); *H04W 4/02* (2013.01)

(58) Field of Classification Search
CPC .................................................. H04L 63/101
USPC ........................................................... 726/4
See application file for complete search history.

(56) References Cited

U.S. PATENT DOCUMENTS

| | | | |
|---|---|---|---|
| 2002/0038384 A1* | 3/2002 | Khan et al. ................. | 709/245 |
| 2005/0004984 A1 | 1/2005 | Simpson | |

(Continued)

FOREIGN PATENT DOCUMENTS

| | | |
|---|---|---|
| GB | 2 403 099 A | 12/2004 |
| GB | WO 2008/142455 A2 * | 11/2008 |

(Continued)

OTHER PUBLICATIONS

Agnieszka Amijewska, "Evaluating Wireless Technologies in Mobile Payments—A customer Centric Approach", 2005, IEEE Computer Society, pp. 1-9.*

(Continued)

*Primary Examiner* — Luu Pham
*Assistant Examiner* — Canh Le
(74) *Attorney, Agent, or Firm* — Ditthavong & Steiner, P.C.

(57) ABSTRACT

A method, and apparatus and computer program for enabling the method, the method comprising: detecting a user input at a first apparatus and, in response to the detection of the user input, selecting content wherein the content is stored at a remote server; establishing a communication link with a second apparatus wherein the second apparatus is different from the first apparatus; transmitting information indicative of the location of the selected stored content over the established communication link to the second apparatus; receiving identification information from the second apparatus over the established communication link wherein the identification information enables at least the user of the second apparatus to be identified; and transmitting information to the remote server to enable a user associated with the received identification information to access the selected stored content.

20 Claims, 6 Drawing Sheets

(51) Int. Cl.
*G06F 21/62* (2013.01)
*H04W 4/02* (2009.01)

(56) References Cited

U.S. PATENT DOCUMENTS

| | | | |
|---|---|---|---|
| 2007/0156636 A1 | 7/2007 | Norton et al. | |
| 2007/0157072 A1* | 7/2007 | LaBiche | 715/501.1 |
| 2007/0288386 A1* | 12/2007 | Adachi et al. | 705/58 |
| 2007/0296805 A1* | 12/2007 | Tedenvall et al. | 348/14.01 |
| 2008/0016177 A1 | 1/2008 | Jin et al. | |
| 2008/0018615 A1* | 1/2008 | Zadesky et al. | 345/173 |
| 2008/0059478 A1 | 3/2008 | Craine | |
| 2008/0267091 A1* | 10/2008 | Parkkinen et al. | 370/255 |
| 2008/0294774 A1* | 11/2008 | Fowler | G06F 21/35 709/225 |
| 2008/0313703 A1* | 12/2008 | Flaks | G06F 17/30876 726/2 |
| 2009/0058819 A1* | 3/2009 | Gioscia et al. | 345/173 |
| 2009/0164645 A1* | 6/2009 | Sylvain | 709/228 |
| 2009/0251420 A1* | 10/2009 | Do et al. | 345/173 |
| 2010/0123737 A1* | 5/2010 | Williamson et al. | 345/672 |

FOREIGN PATENT DOCUMENTS

| | | |
|---|---|---|
| WO | WO2006059178 | 6/2006 |
| WO | WO 2007/075201 A1 | 7/2007 |
| WO | WO 2007/091238 A2 | 8/2007 |
| WO | WO 2008/142138 A2 | 11/2008 |

OTHER PUBLICATIONS

Kyung-Ah Chang & Byung-Rae Lee, "Multimedia Rights Management for Multiple Devices of End-User," 2003, IEEE Computer Society, pp. 1-6.*

International search report and written opinion for corresponding international application PCT/FI2009/050979 dated Apr. 14, 2010, pp. 1-14.

Supplementary European Search Report for EP09836125 dated Apr. 27, 2012, pp. 1-8.

European Office Action for related European Patent Application No. 09836125.6—1853 dated Jan. 5, 2016, 7 Pages.

* cited by examiner

METHOD, APPARATUS AND COMPUTER PROGRAM FOR ENABLING ACCESS TO REMOTELY STORED CONTENT

FIELD OF THE INVENTION

Embodiments of the present invention relate to a method, apparatus and computer program. In particular, they relate to a method, apparatus and computer program for enabling access to content.

BACKGROUND TO THE INVENTION

Systems for enabling a user to store content at a remote server and enable third parties to access the content are well known. For example social networking websites enable a user to store content such as images and messages and enable authorized users of the networking website to access the content.

It is useful for a user to be able to update the access rights associated with their stored content so as to change who has access to their content.

BRIEF DESCRIPTION OF VARIOUS EMBODIMENTS OF THE INVENTION

According to various, but not necessarily all, embodiments of the invention there is provided a method comprising: detecting a user input at a first apparatus and, in response to the detection of the user input, selecting content wherein the content is stored at a remote server; establishing a communication link with a second apparatus wherein the second apparatus is different from the first apparatus; transmitting information indicative of the location of the selected stored content over the established communication link to the second apparatus; receiving identification information from the second apparatus over the established communication link wherein the identification information enables at least the user of the second apparatus to be identified; and transmitting information to the remote server to enable a user associated with the received identification information to access the selected stored content.

In some embodiments of the invention the communication link with the second apparatus may be established in response to the detection of the user input. The communication link with the second apparatus may be a wireless communication link such as a short range wireless communication link.

In some embodiments of the invention the user input may be a trace input on a touch sensitive user input device. In some embodiments of the invention the trace input may extend to an edge of the touch sensitive user input device. In other embodiments of the invention the trace input may extend to a portion of an image presented on a touch sensitive display.

In some embodiments of the invention the identification information may enable a plurality of users to be identified.

In some embodiments of the invention the information transmitted to the remote server may be transmitted in response to the receipt of the identification information.

According to various, but not necessarily all, embodiments of the invention there is provided an apparatus comprising: a user input device configured to enable a user to select content wherein the content is stored at a remote server; a transceiver configured to enable a communication link to be established with a second apparatus, wherein the second apparatus is different from the first apparatus, and the established communication link enables identification information to be received from the second apparatus over the communication link wherein the identification information enables at least the user of the second apparatus to be identified; and a controller configured to enable information indicative of the location of selected stored content to be transmitted over the established communication link to the second apparatus and to enable information to be transmitted to the remote server wherein the information transmitted to the remote server enables a user associated with received identification information to access the selected stored content.

In some embodiments of the invention the communication link with the second apparatus may be established in response to detection of actuation of the user input device. The communication link with the second apparatus may be a wireless communication link such as a short range wireless communication link.

In some embodiments of the invention the user input device may be a touch sensitive user input device configured to enable a user to make trace user inputs. The controller is configured to detect a trace input extending to the edge of the touch sensitive user input device. In some embodiments of the invention the touch sensitive user input device may comprise a touch sensitive display and the controller may be configured to detect a trace input which extends to a portion of an image presented on the touch sensitive display.

In some embodiments of the invention the identification information may enable a plurality of users to be identified.

In some embodiments of the invention the information transmitted to the remote server may be transmitted in response to the receipt of the identification information.

The apparatus may be for wireless communication or rendering content.

According to various, but not necessarily all, embodiments of the invention there is provided a computer program comprising computer program instruction means configured to control an apparatus, the apparatus comprising a user input device and a transceiver wherein the transceiver is configured to enable a communication link to be established with a second apparatus wherein the second apparatus is different from the first apparatus, such that identification information may be received from the second apparatus over the communication link wherein the identification information enables at least the user of the second apparatus to be identified the program instructions providing, when loaded into a processor; means for detecting a user input and, in response to the detection of the user input, selecting content wherein the content is stored at a remote server; means for transmitting information indicative of the location of the identified stored content over the established communication link to the second apparatus; and means for transmitting information to the remote server to enable a user associated with the received identification information to access the identified stored content.

In some embodiments of the invention there may be provided a physical entity embodying the computer program as described above. In some embodiments of the invention there may be provided an electromagnetic carrier signal carrying the computer program as described above.

In some embodiments of the invention there may be provided a computer program comprising program instructions for causing a computer to perform the method of any of the above paragraphs.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

The Figures illustrate a method comprising: detecting 31 a user input at a first apparatus 30 and, in response to the detection 31 of the user input, selecting 33 content 22 wherein the content 22 is stored at a remote server 20; establishing a communication link 60 with a second apparatus 40 wherein the second apparatus 40 is different from the first apparatus 30; transmitting 37 information indicative of the location of the selected stored content 22 over the established communication link 60 to the second apparatus 40; receiving 39 identification information from the second apparatus 40 over the established communication link 60 wherein the identification information enables at least the user of the second apparatus 40 to be identified; and transmitting information to the remote server 20 to enable a user associated with the received identification information to access the selected stored content 22.

Figure 1:
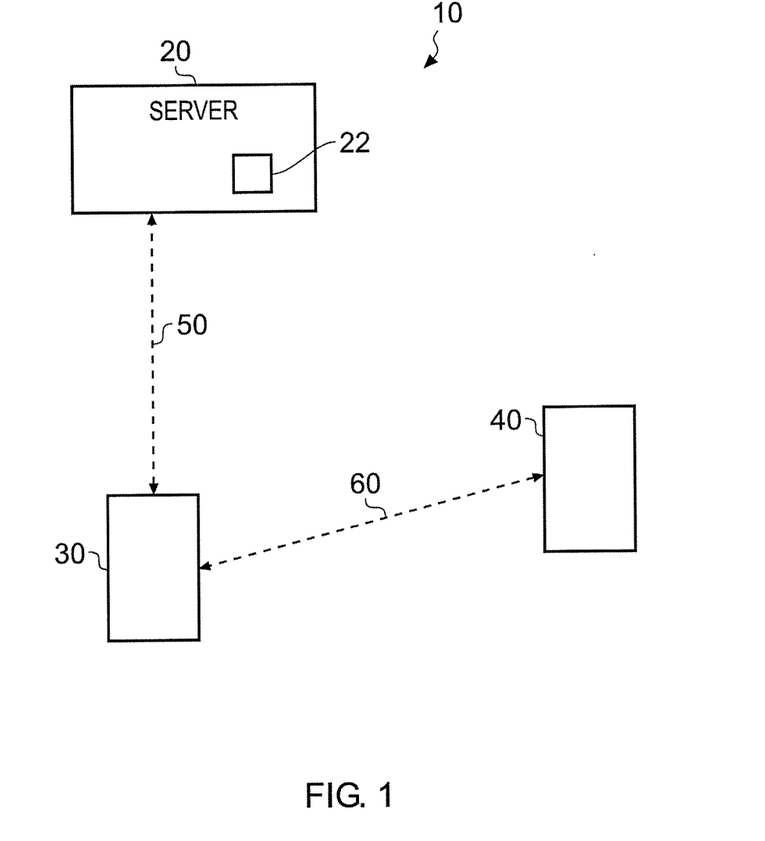
FIG. 1 illustrates a system according to an embodiment of the invention.

FIG. 1 illustrates a system 10 according to a first embodiment of the invention. In the illustrated embodiment the system 10 comprises a server 20, a first apparatus 30 and a second apparatus 40. The system 10 also comprises a first communication link 50 between the first apparatus 30 and the server 20 and a second communication link 60 between the first apparatus 30 and the second apparatus 40.

It is to be appreciated that in other embodiments of the invention the system 10 may comprise different numbers of apparatus. For example, the system 10 may comprise more than one second apparatus 40. It is also to be appreciated that the system may comprise other communication links, for example, there may be a communication link between the second apparatus 40 and the remote server 20.

The first apparatus 30 may be an electronic apparatus. The first apparatus 30 may be a mobile apparatus 30 which may be easily carried by a user. The first apparatus 30 may be a handheld apparatus which can be carried in a users hand, handbag or jacket pocket for example. The first apparatus 30 may be, for example, a mobile cellular telephone, a personal computer, a camera, a personal digital assistant or any other apparatus 30 that stores content or enables the content to be stored at a remote server 20.

The first apparatus 30 is configured to enable a first communication link 50 to be established with the remote server 20. The first communication link 50 may be any means which enables information to be transferred between the first apparatus 30 and the server 20. The communication link 50 may comprise a wired communication connection or it may comprise a wireless communication connection or it may comprise both wired and wireless connections.

The first communication link 50 may be a secure communication link.

The first apparatus 30 is also configured to enable a second communication link 60 to be established with the second apparatus 40. The second communication link 60 may be any means which enables information to be transferred between the first apparatus 30 and the second apparatus 40. The second communication link 60 may be a wireless communication link. In some embodiments of the invention the second communication link 60 may be a short range wireless communication link such as a Bluetooth link, a wireless local area network (WLAN) link, a near field communication (NFC) link or a radio frequency identification (RFID) link. In other embodiments of the invention the communications link 60 may be a cellular network communication link.

The second communication link 60 may be a secure communication link.

It is to be appreciated that there may be more than one communication link between the first and second apparatus 30, 40, for example there may be both a short range wireless communication link such as a Bluetooth link and a longer range wireless communication link such as a cellular network link.

Figure 2:
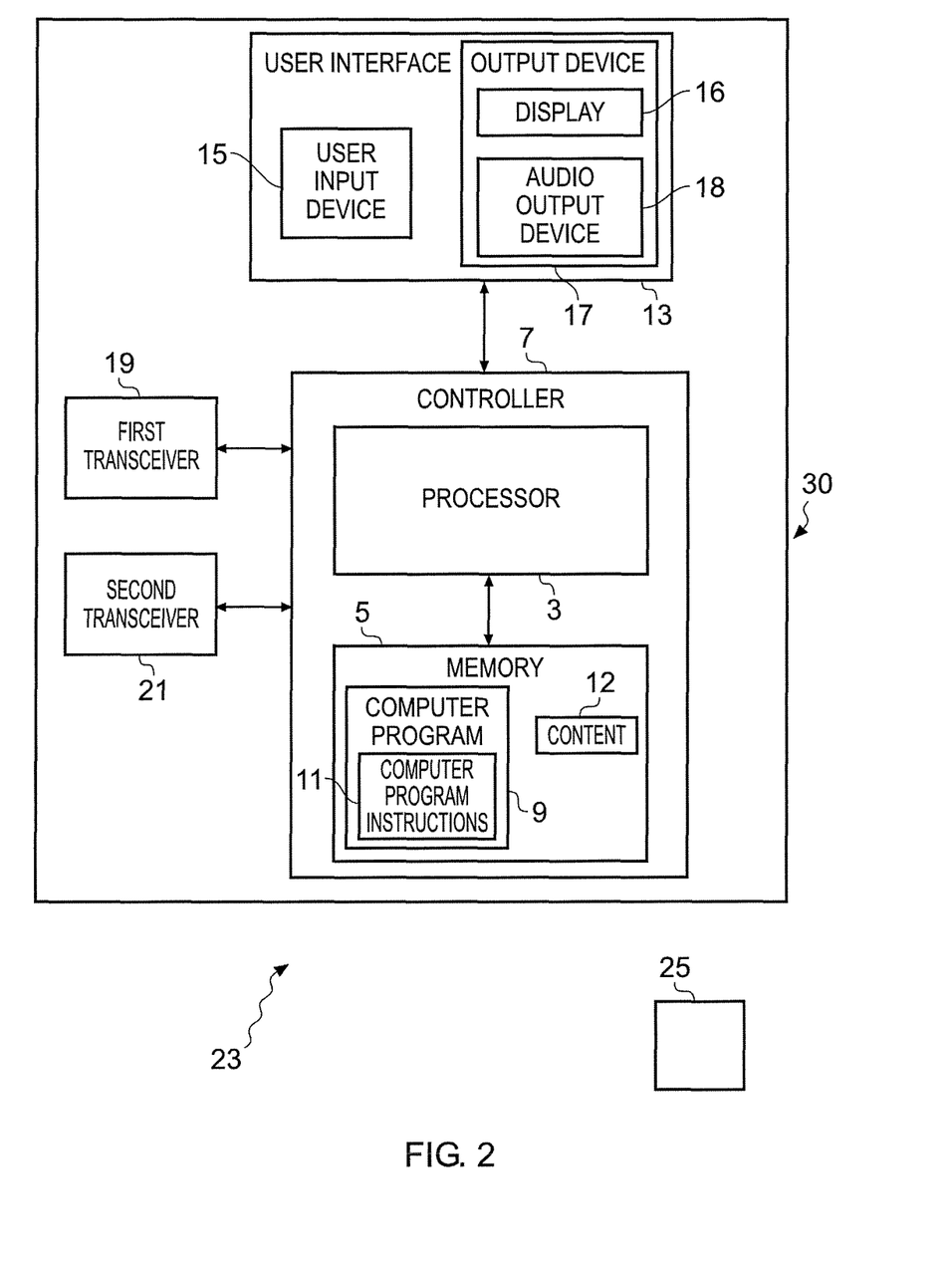
FIG. 2 illustrates a first apparatus of the system of FIG. 1 in more detail.

An example of a first apparatus 30 according to a first embodiment of the invention is illustrated in more detail in FIG. 2.

The second apparatus 40 may also be an electronic apparatus. The second apparatus 40 may also be a mobile apparatus 40 which may be easily carried by a user. The second apparatus 40 may be a handheld apparatus which can be carried in a users hand, handbag or jacket pocket for example. The second apparatus 40 may be, for example, a mobile cellular telephone, a personal computer, a camera, a personal digital assistant or any other apparatus 40 that enables access to content and enables the access to be rendered.

The second apparatus 40 is a different apparatus from the first apparatus 10. The second apparatus 40 is separate from the first apparatus 30 so that the first apparatus 30 may only communicate with the second apparatus 40 via the external communication link 60. As both the first apparatus 30 and the second apparatus 40 may be mobile the distance separating the first apparatus 30 from the second apparatus 40 may vary. In some embodiments of the invention the first and second apparatus 30, 40 may be adjacent to each other so that they are in physical contact with each other. In other embodiments of the invention they may be several meters apart.

In some embodiments of the invention the communication link 60 may only be established when the second apparatus 40 is brought within a predetermined distance of the first apparatus 30. For example, in embodiments of the invention where the second communication link 60 is a short range wireless communication link the link may only be established when the second apparatus 40 is brought within the communication range of the first apparatus 30 which may be several meters or less. The second communication link 60 may be terminated when the second apparatus 40 is moved out of the communication range of the first apparatus 30.

The server 20 is remote from the first apparatus 30. The server 20 may be located far away from the first apparatus 30. In some embodiments of the invention the server 20 may be located many kilometers away from the first apparatus 30. The server 20 may also be remote from the second apparatus 40 so that the second apparatus 40 is also located far away from the server 20.

The remote apparatus 30 may communicate with the server 20 via the communication link 50. As mentioned above the communication link may comprise wired and/or wireless connections. The server 20 may be configured to communicate with a plurality of other remote apparatus, such as the second apparatus 40, using similar communication links.

The server 20 stores content 22. The content 22 may comprise content which has been created by a user of the first apparatus 30. For example the content may be an image or a video taken by the user of the first apparatus 30 or text which has been input by the user of the first apparatus 30. The content 22 may also comprise content 22 which has been received by the first apparatus 30, for example the content 22 may comprise messages which have been received from another apparatus or it may be images or audio content which have been downloaded from another server.

The content 22 may be stored in a file system comprising a plurality of pieces of content. Each piece of content may have a file name associated with it which indicates where the piece of content is stored within the file system.

The server 20 is configured to enable the user of the first apparatus 30 to access the stored content 22. The server 20 may also be configured to enable the user of the first apparatus 30 to assign an access right to the content 22 which they have stored at the server 20 to enable third parties to access the stored content 20. The user of the first apparatus 30 may be able to select which third parties have access to the stored content. For example, the user of the first apparatus 30 may be able to generate a list of authorized third parties who have permission to access the stored content 22.

In some embodiments of the invention there may be a plurality of different access levels which may be assigned to the content 22. Different third parties may be assigned different access levels. For example a first access level enables a third party to access the content 22 and enable the content 22 to be rendered on a second apparatus 40 but does not enable the third party to edit the content 22. A second access level may enable the third party to render the content 22 and also to edit the content 22. A third access level may prevent the third party from accessing the content 22.

The user of the first apparatus 30 may be able to assign the same access level to a plurality of third parties. For instance, the user of the first apparatus may have groups of contacts within a stored contacts list, for example they may have a plurality of contacts which are designated as members of a friend group. The user of the first apparatus 30 may be able to designate an access level to the friend group so that all members of the group have the same access level.

The assigned access level may be dependent upon other factors such as the time of day and the location of the user of the first apparatus 30 or the user of the third party.

FIG. 2 schematically illustrates a first apparatus 30 according to an embodiment of the invention. Only features referred to in the following description are illustrated. It should, however, be understood that the first apparatus 30 may comprise additional features that are not illustrated.

As mentioned above the first apparatus 30 may be an electronic apparatus such as a mobile cellular telephone, a personal computer, a camera or a personal digital assistant. The first apparatus 30 may comprise means for enabling content to be generated or received from another apparatus. The first apparatus 30 may also comprise means for enabling the content to be transmitted to the remote server 20 for storing.

The illustrated first apparatus 30 comprises: a user interface 13, a controller 7 and a first transceiver 19. In some embodiments of the invention the first apparatus 30 may also comprise a second transceiver 21.

In the illustrated embodiment the controller 7 comprises a processor 3 and a memory 5 and the user interface 13 comprises an output device 17 and a user input device 15.

The controller 7 provides means for controlling the first apparatus 30. The controller 7 may be implemented using instructions that enable hardware functionality, for example, by using executable computer program instructions 11 in a general-purpose or special-purpose processor 3 that may be stored on a computer readable storage medium 25 (e.g. disk, memory etc) to be executed by such a processor 3.

The processor 3 is configured to receive input commands from the user interface 13 and also to provide output commands to the user interface 13. The processor 3 is also configured to write to and read from the memory 5.

The user interface 13 comprises a user input device 15 and an output device 17.

The user input device 15 may be any means which enables a user to input information into the first apparatus 30. For example the user input device 15 may be a keypad or a touch sensitive display or a combination of a number of different types of user input devices.

The user input device 15 may enable a user to use the first apparatus 30 to create content. For instance it may comprise means, such as a keypad or a touch sensitive display, for enabling a user to input text. In some embodiments of the invention the apparatus 30 may comprise an image capturing device and the user input device 15 may enable a user to control the apparatus 30 to capture an image or a series of images.

The output device 17 may be any means which enable an output to be provided to a user of the first apparatus 30. In the illustrated embodiment the output device 17 comprises a display 16 and an audio output device 18. In other embodiments of the invention other output devices may also be provided.

The display 16 is configured to display information to a user. The information displayed on the display 16 may be information which has been input using the user input device 15 or it may be information which is stored in the memory 5 of the first apparatus 30. The display 16 may also be configured to display content which may be stored in the memory 5 and/or the remote server 20.

The audio output device 18 is configured to provide information as an audio output. The audio information may accompany images which are displayed on the display 16. the audio output device 18 may also enable audio content to be rendered. The audio content may be stored in the memory 5 and/or the remote server 22.

The memory 5 stores a computer program 9 comprising computer program instructions 11 that control the operation of the first apparatus 30 when loaded into the processor 3. The computer program instructions 11 provide the logic and routines that enables the first apparatus 30 to perform the methods illustrated in FIG. 3. The processor 3 by reading the memory 5 is able to load and execute the computer program 9.

The computer program instructions 11 may provide computer readable program means for enabling the first transceiver 19 to establish a communication link 60 with a second apparatus 40, wherein the second apparatus 40 is different from the first apparatus 30, such that identification information may be received from the second apparatus 40 over the communication link 60 wherein the identification information enables at least the user of the second apparatus 40 to be identified.

The computer program instructions 11 may also provide computer readable program means for detecting a user input and, in response to the detection of the user input, selecting content 22 wherein the content 22 is stored at a remote server 20, means for transmitting information indicative of the location of the identified stored content 22 over the established communication link 60 to the second apparatus 40 and means for transmitting information to the remote server 20 to enable a user associated with the received identification information to access the identified stored content 22.

The computer program 9 may arrive at the first apparatus 30 via any suitable delivery mechanism 23, 25. The delivery mechanism 23, 25 may be, for example, a computer-readable storage medium, a computer program product 25, a memory device, a record medium such as a CD-ROM or DVD, an article of manufacture that tangibly embodies the computer program 9. The delivery mechanism may be a signal 23 configured to reliably transfer the computer program 9. The first apparatus 30 may propagate or transmit the computer program 9 as a computer data signal.

The memory 5 may also store content 12. The content 12 may be content which has been input by the user of the first apparatus 30 or it may be content 12 which has been downloaded from a remote server 20. The content 12 may be stored in the memory 5 temporarily.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device.

The first transceiver 19 may be any means which enables a communication link 60 to be established between the first apparatus 30 and the second apparatus 40.

In some embodiments of the invention the first transceiver 19 may be configured to enable short range wireless communication. For example the first transceiver may be configured to operate in a frequency band according to a radio communication protocol such as Bluetooth (2400-2483.5 MHz), WLAN (2400-2483.5 MHz) or NFC (13.56 MHz). The first transceiver 19 may have a communication range of several meters.

In other embodiments of the invention the first transceiver 19 may be configured to enable long range wireless communication. For example the first transceiver may be configured to operate in a cellular communications network.

The controller 7 may be configured to provide information to the first transceiver 19 for transmission over the communication link 60 to the second apparatus 40. The controller 7 may also be configured to decode radio signals received from the second apparatus 40 by the first transceiver 19 into information. The received information may be stored in the memory 5.

The information received by the first transceiver 19 may comprise information which enables the second apparatus 40 to be identified.

In some embodiments of the invention the first apparatus 30 may also comprise a second transceiver 21. The further transceiver 21 may be any means which enables a communication link to be established between the first apparatus 30 and a remote server 20.

The second transceiver 21 may be configured to enable wireless communication between the first apparatus 30 and the server 20. In other embodiments of the invention the second transceiver 21 may enable wired communication between the first apparatus 30 and the server 20.

The controller 7 may be configured to provide information to the second transceiver 21 for transmission over the communication link 50 between the first apparatus 30 and the remote server 20. The controller 7 may also be configured to decode radio signals received by the further transceiver 21 into information.

It is to be appreciated that in some embodiments of the invention only a single transceiver may be provided and this may be configured to provide both the first communication link 50, between the first apparatus 30 and the server 20, and the second communication link 60 between the first apparatus 30 and the second apparatus 40. It is also to be appreciated that separate transmitters and receivers may be provided rather than transceivers.

A method of enabling access to remotely stored content, using the system and apparatus described above, is illustrated schematically in FIG. 3.

Figure 3:
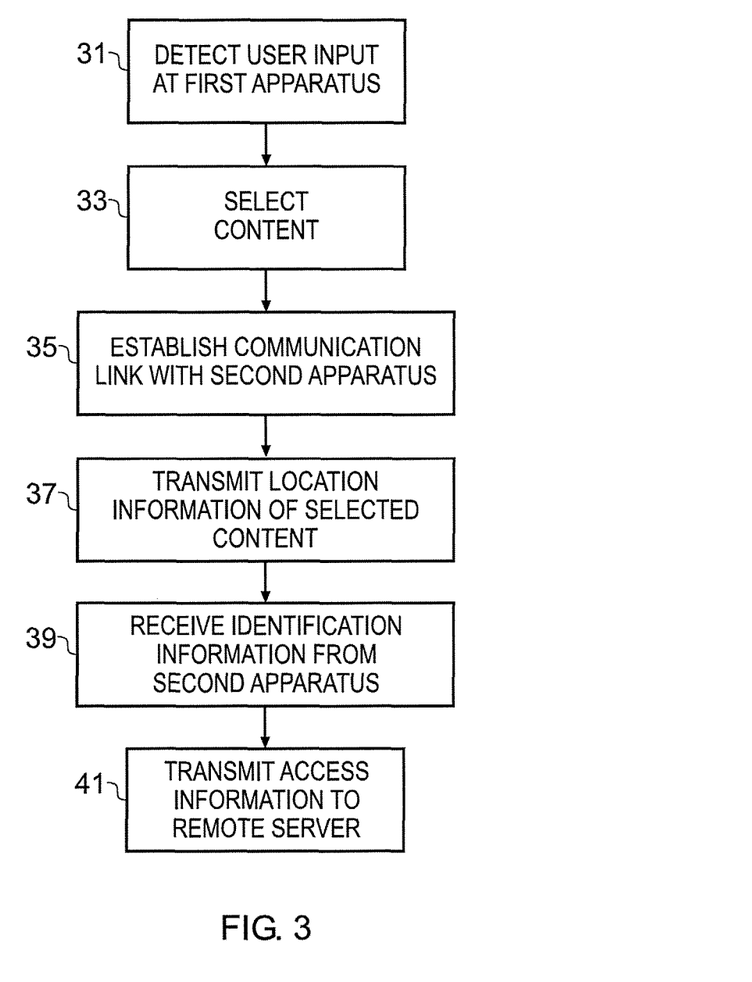
FIG. 3 illustrates a flow chart showing method blocks of an embodiment of the invention.

At block 31 the controller 7 of the first apparatus 30 detects a user input. The detected user input may be actuation of the user input device 15. In response to the detection 31 of the user input, content 22 which is stored at the remote server 20, is selected at block 33. Once the content 22 has been selected information may be presented to the user to indicate which content 22 has been selected. For example an icon corresponding to the selected content 22 may be highlighted on the display 16.

In some embodiments of the invention the user may also make a further user input via the user input device 15 to indicate that they wish to enable a third party to access the content 22. The third party may be a user of the second apparatus 40. The further user input may indicate which level of access they wish to assign to the third party.

At block 35 the second communication link 60 is established between the first apparatus 30 and a second apparatus 40. It is to be appreciated that establishing 35 a communication link 60 between the first apparatus 30 and a second apparatus 40 may involve steps being carried out by both the first apparatus 30 and the second apparatus 40.

The communication link 60 may be established 35 automatically, without the need for any further user input. For example the communication link 60 may be a Bluetooth communication link and all steps necessary to enable the communication link 60 to be established may be carried out automatically by the controller 7 of the first apparatus 30 without any further input from the user.

In other embodiments of the invention some user input may be necessary in order to enable the communication link 60 to be established 35. For example, the communication link 60 may be a near field communication link which may have a very short communication range of several centimeters. In order to enable the near field communication link to be established it may be necessary to bring the first apparatus 30 and the second apparatus 40 within a few centimeters of each other. In some embodiments it may be necessary to have the first apparatus 30 and the second apparatus 40 in physical contact with each other.

At block 37 the first apparatus 30 transmits location information indicative of the location of the selected content to the second apparatus 40 over the established communication link 60. The location information enables the second apparatus 40 to find the stored content within the remote server 20. The location information may be a file name which indicates the location of the content within a file system. The file name may also indicate the format of the content. The location information may comprise a uniform resource locator (URL).

At block 39 the first apparatus 30 receives identification information from the second apparatus 40 over the established communication link 60. The identification information may enable the user of the second apparatus to be identified. The identification information may comprise information which is unique to the user of the second apparatus. For example, it may be an identification of the user on an internet networking site or a unique code such as a personal identification number (PIN).

In other embodiments of the invention the identification information may enable a plurality of third parties to be identified. The plurality of third parties may include the user of the second apparatus. For example the identification information may identify a group comprising a plurality of members, one of which is the user of the second apparatus 40. Or the identification information may be a number or a code which is known to a plurality of users of other apparatus including the user of the second apparatus 40.

At block 41 the first apparatus 30 transmits a message to the remote server 20 over the first communication link 50 to update the access rights associated with the selected content 22. In some embodiments the access rights may be updated by adding the user of the second apparatus 40 to the list of third parties who have permission to access the content 22. In other embodiments of the invention the access rights may be updated by changing the access level assigned to the user of the second apparatus 40 from a first access level to a second access level.

The access message may specify the selected content, the third party or plurality of third parties who are to have their access rights updated and the access level which is to be assigned to the third party or plurality of third parties.

The access message may be transmitted 41 automatically once the identification information has been received 39. For example, once identification information has been received 39 from the second apparatus 40 no further user input is required to enable the access tights to be updated. In other embodiments of the invention a further user input may be required, for example, it may be necessary for the user to specify which access level is to be assigned to the user of the second apparatus 40.

In some embodiments of the invention the first communication link 50 may not be established when the first apparatus 30 receives 39 the identification information, in which case the access message may be temporarily stored in the memory 5 until the communication link 50 is established. In some embodiments of the invention the controller 7 of the first apparatus 30 may be configured to automatically establish the communication link 50 in response to the receipt 39 of the identification information so that the access message is sent shortly after receipt 39 of the identification information. In other embodiments this may not be possible, for example the first apparatus 30 may be located out of the communication range of the remote server 20 or a further user input may be required in order to establish the communication link 50. In such cases the access message will be stored in the memory until the next time the communication link 50 is established when the access message will be transmitted 41 to the server 20.

Once the access message is received by the remote server 20 the remote server 20 will update the access rights associated with the selected content 22 so that the third party or third parties identified in the access message can access the selected content in accordance with the specified access level.

Figure 4A:
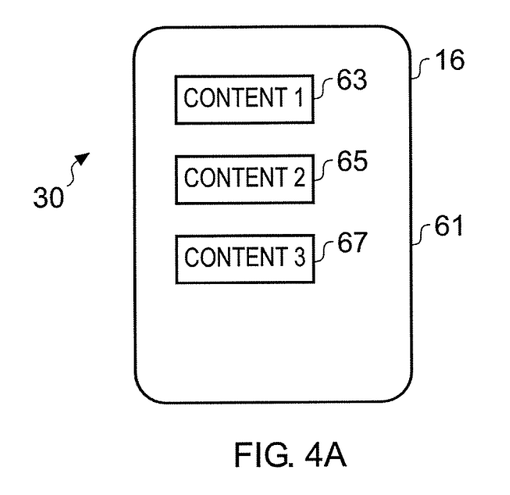
FIGS. 4A to 4C illustrate a first embodiment of the invention in use.
Figure 4B:
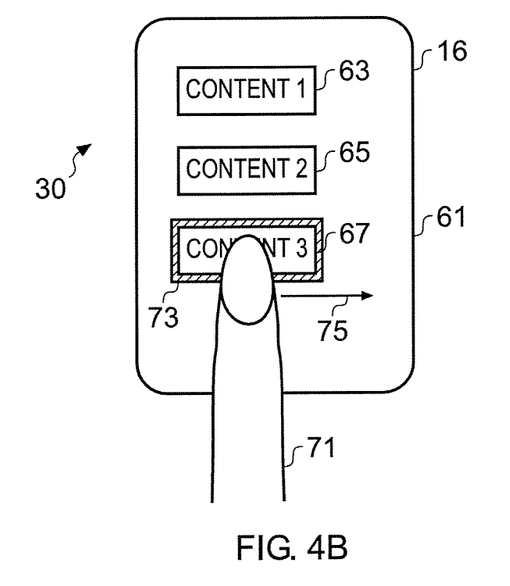
Figure 4C:
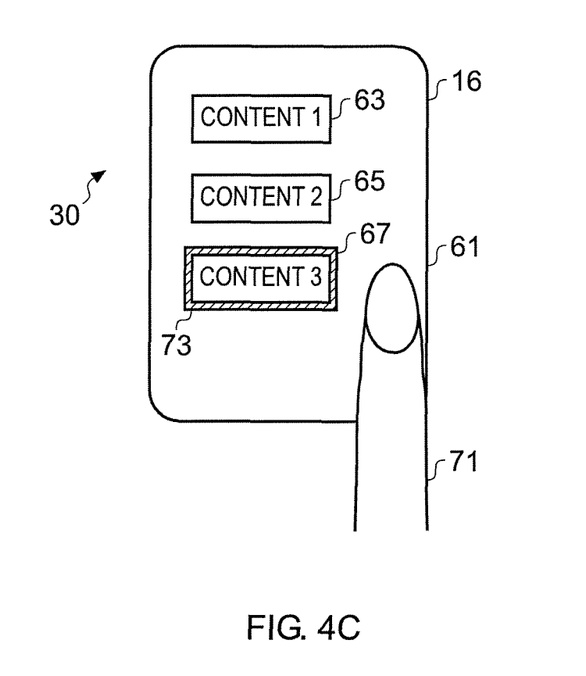

FIGS. 4A to 4C illustrate an embodiment of the invention in use. FIG. 4A illustrates a graphical user interface 61 which is displayed on the display 16 of the first apparatus 30. In the embodiment of the invention illustrated in FIGS. 4A to 4C the display 16 is a touch sensitive display which enables a user to make touch inputs by actuating the surface of the display 16. A user may actuate the surface of the display 16 by using their finger 71 or thumb or any other suitable object such as a stylus to physically make contact with the surface. In some embodiments the user may also be able to actuate the surface of the display 16 by bringing their finger 71, thumb or stylus close to the surface of the display 16.

The graphical user interface 61 presented in FIG. 4A comprises a plurality of icons 63, 65, 67. Each of the icons 63, 65, 67 represents content. The content may be stored at the remote server 20. The content may also be stored in the memory 5 of the first apparatus 30 so that the user of the first apparatus 30 can access the content even when the first communication link 50 between the first apparatus 30 and the remote server 20 is not established.

The icons 63, 65, 67 may comprise a label indicative of the content represented by the icon. In some embodiments of the invention the icon 63, 65, 67 may comprise text which indicates a name assigned to the content. In some embodiments of the invention the icon 63, 65, 67 may comprise an image representative of the content. For example where the content is a photograph the icon 63, 65, 67 may be a small image of the photograph or part of the photograph.

In the illustrated embodiment the icons 63, 65, 67 have the labels "content 1", "content 2" and "content 3" respectively.

In FIG. 4B the user makes a user input to select content 20 which they wish to enable a third party to access. In the exemplary embodiment in FIG. 4B the user selects the content by touching the display 16 with their finger 71 in the area of the display 16 in which the icon 63, 65, 67 representing the content which they wish to select is displayed.

In the embodiment illustrated in FIG. 4B the user has touched the area of the display 16 in which the icon 67 with the label "content 3" is displayed. In response to the detection 31 of this user input "content 3" will be selected 33.

Once the content 22 has been selected the icon 67 corresponding to the selected content 22 is highlighted to distinguish the selected icon 67 from the other icons 63, 65 which have not been selected. The selected icon 67 may be highlighted by changing the color or the dimensions of the icon 67 presented on the display 16. In the illustrated embodiment a border 73 is provided around the selected icon to indicate that it has been selected.

Once the content 22 has been selected the user makes a trace input on the surface of the display 16. A user may make a trace input by actuating the surface of the display 16 and then dragging their finger 71, thumb or stylus across the surface. In the example illustrated in FIG. 4B the user makes the trace input by dragging their finger 71 from the area of the display 16 in which the selected icon 67 is displayed toward the edge of the display 16 in the general direction indicated by the arrow 75.

In FIG. 4C the user has completed the trace user input. The finger 71 is now positioned at the edge of the display 16. In the illustrated embodiment the selected icon 67 is still highlighted. In other embodiments of the invention the selected icon 67 may move as the user makes the trace input so that the icon 67 would now also be positioned at the edge of the display 16.

In response to the detection that the trace input has been completed the controller 7 will control the first apparatus 30 to establish a communication link 60 with a second apparatus 40. As described above the communication link 60 enables the second apparatus 40 to send identification information to the first apparatus 30 and enables the first apparatus 30 to send location information to the second apparatus 40. The communication link 60 may be established automatically in response to the trace user input and may require no further input from the user of the first apparatus 30 other than the trace input.

Similarly in accordance with the above described method the transmission of the update access message may also happen automatically without any further input from the user of the first apparatus 30.

Using a trace input which extends from the selected icon 67 to the edge of the display 16 provides a simple and intuitive way of enabling a user to control the first apparatus 30 to update the access rights associated with content 22 which is stored at a remote server 20. The trace input imitates the transferring of the rights from the first apparatus 30 to the user of the second apparatus 40 and is so is intuitive for a user. Also the trace input provides the advantage that it does not require a user to have to navigate through any menus. It also provides the advantage that no further icons have to be presented on the display 16 to indicate the functions that may be performed on the icons 63, 65, 67 which represent stored content. This enables more of the display 16 to be used to display the icons 63, 65, 67 which represent stored content which may be particularly advantageous in apparatus which have a relatively small display 16.

Figure 5A:
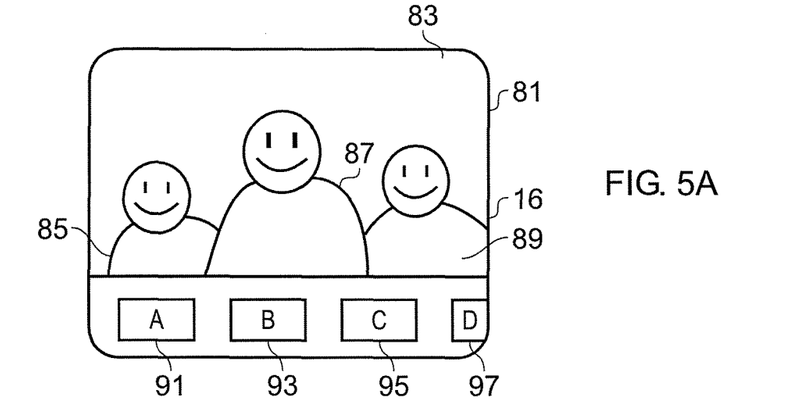
FIGS. 5A to 5C illustrate a second embodiment of the invention in use.
Figure 5B:
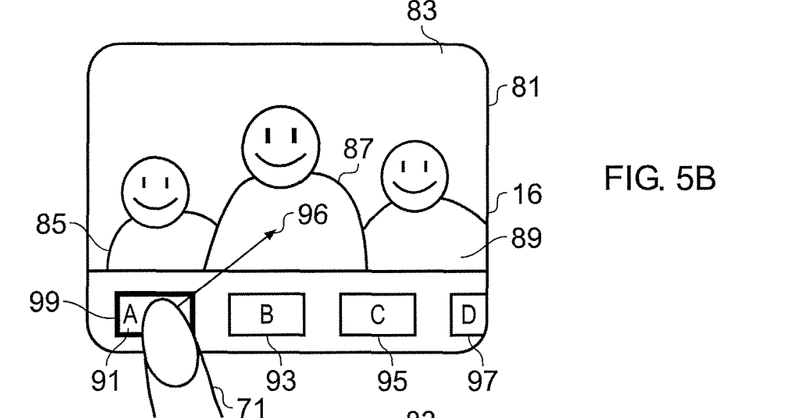
Figure 5C:
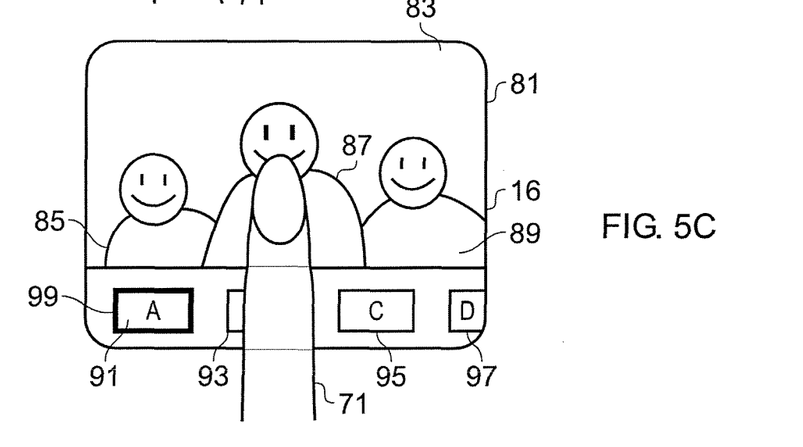

FIGS. 5A to 5C illustrate a second embodiment of the invention in use. FIG. 5A illustrates a graphical user interface 81 which is displayed on the display 16 of the first apparatus 30. In the embodiment of the invention illustrated in FIGS. 5A to 5C the display 16 is touch sensitive display which enables a user to make touch inputs by actuating the surface of the display 16 as described in relation to the previous embodiment.

The graphical user interface 81 displayed on the display in FIG. 5A comprises an image 83. The image 83 may be a photograph which has been captured by the first apparatus 30 and is stored in the memory 5 of the first apparatus 30.

In the photograph illustrated in FIG. 5A there are a plurality of people 85, 87, 89. One or more of the people 85, 87, 89 may be third parties who are known to the user of the first apparatus 30.

Contact information may be stored in the memory 5 of the first apparatus 30. The contact information may comprise a plurality of entries. Each entry may provide sufficient information to enable a communication link 60 to be established between the first apparatus 30 and a second apparatus 40 belonging to a third party. An entry of contact information may comprise an image of the third party associated with the contact information.

In the embodiment illustrated in FIGS. 5A to 5C the first apparatus 30 may be configured to recognize the faces in the image 83. The apparatus 30 may be configured to compare the faces in the image 83 with other faces in other images stored in the memory 5 of the apparatus 30 and determine when the faces correspond to the same person. The apparatus 30 may be configured to determine when a person 85, 87, 89 in the photograph is associated with an entry of contact information by comparing the faces in the photograph 83 with the images stored with the contact information.

The graphical user interface 81 presented in FIG. 5A comprises a plurality of icons 91, 93, 95 and 97. In the illustrated embodiment the icons 91, 93, 95 and 97 are presented in a different portion of the display 16 to the image 83.

Each of the icons 91, 93, 95 and 97 represents content. The content may be stored at the remote server 20. The content may also be stored in the memory 5 of the first apparatus 30 so that the user of the first apparatus 30 can access the content even when the first communication link 50 between the first apparatus 30 and the remote server 20 is not established.

The icons 91, 93, 95 and 97 may comprise a label indicative of the content represented by the icon. In some embodiments of the invention the icon may comprise text which indicates a name assigned to the content. In some embodiments of the invention the icon may comprise an image representative of the content. For example where the content is a photograph the icon 91, 93, 95 and 97 may be a small image of the photograph or part of the photograph.

In the illustrated embodiment the icons 91, 93, 95 and 97 have the labels "A", "B", "C" and "D" respectively.

In FIG. 5B the user makes a user input to select content 20 which they wish to enable a third party to access. In the exemplary embodiment in FIG. 5B the user selects the content by touching the display 16 with their finger 71 in the area of the display 16 in which the icon 91, 93, 95 and 97 which represents the content which they wish to select is presented.

In the embodiment illustrated in FIG. 5B the user has touched the area of the display 16 in which the icon 91 with the label "A" is displayed. In response to the detection 31 of this user input content "A" will be selected 33.

Once the content 22 has been selected the icon 91 corresponding to the selected content 22 is highlighted to distinguish the selected icon 91 from the other icons 93, 95, 97 which have not been selected. The selected icon 91 may be highlighted by changing the color or the dimensions of the icon 91 presented on the display 16. In the illustrated embodiment a border 99 is provided around the selected icon to indicate that it has been selected.

Once the content 22 has been selected the user makes a trace input on the surface of the display 16. A user may make a trace input by actuating the surface of the display 16 and then dragging their finger 71, thumb or stylus across the surface. In the example illustrated in FIG. 5B the user makes the trace input by dragging their finger from the area of the display 16 in which the selected icon 91 is displayed toward portion of the display 16 where the faces are displayed in the image 83.

In FIG. 5C the user has completed the trace user input. The finger 71 is now positioned over the portion on the display in which a face of a person 87 is presented. In the illustrated embodiment the selected icon 91 is still highlighted. In other embodiments of the invention the selected icon 91 may move as the user makes the trace input so that the icon 67 would now also be positioned over the face of the person 87.

In response to the detection that the trace input has been completed the controller 7 will control the first apparatus 30 to establish a communication link 60 with a second apparatus 40.

The contact information which is stored in the memory 5 may be used to establish the communication link 60 with the second apparatus 40. The first apparatus 30 may determine that the face of the person 87 matches a face in an image associated with an entry of contact information. The entry of contact information may be retrieved from the memory 5 and used to enable a communication link to be established 60.

As described above the communication link 60 enables the second apparatus 40 to send identification information to the first apparatus 30 and enables the first apparatus 30 to send location information to the second apparatus 40. The communication link 60 may be established automatically in response to the trace user input and may require no further input from the user of the first apparatus 30 other than the trace input.

Similarly in accordance with the above described method the transmission of the update access message may also happen automatically without any further input from the user of the first apparatus 30.

Using a trace input which extends from the selected icon 91 to the face of a third party in an image 83 presented on the display 16 provides another simple and intuitive way of enabling a user to control the first apparatus 30 to update the access rights associated with content 22 which is stored at a remote server 20. The trace input provides the advantage that it does not require a user to have to navigate through any menus as the apparatus 30 will automatically retrieve the required contact information when it recognizes that there is a match with the images.

Embodiments of the invention as described above enable a user of a mobile apparatus to quickly and easily update access rights associated with content which is stored at a remote server. This may be particularly advantageous, in circumstances where a user has met a third party and wishes to share content with the third party. For example a third party may be a friend and the user may wish to share personal content such as photographs with their friend.

As the content 22 is stored at a remote server only a small amount of information needs to be sent over the communication links 50, 60. This enables the access rights to be updated even if the communication links 50, 60 are weak.

The blocks illustrated in the FIG. 3 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method comprising:
   determining to detect a user input at a first apparatus and, in response to the detection of the user input, selecting content that is stored at a remote server;
   determining to establish a communication link with a second apparatus wherein the second apparatus is different from the first apparatus;
   causing, at least in part, a transmission over the established communication link of information indicative of a location of the selected stored content to the second apparatus;
   causing, at least in part, a transmission over the established communication link of identification information that enables at least a user of the second apparatus to be identified to the first apparatus; and
   causing, at least in part, a transmission of information to the remote server to enable the user associated with the received identification information to access the selected stored content.

2. The method of claim 1, wherein the communication link with the second apparatus is established in response to the detection of the user input.

3. The method of claim 1, wherein the communication link with the second apparatus is a wireless communication link.

4. The method of claim 3, wherein the communication link with the second apparatus is a short range wireless communication link.

5. The method of claim 1, wherein the user input is a trace input on a touch sensitive user input device.

6. The method of claim 5, wherein the trace input extends to an edge of the touch sensitive user input device.

7. The method of claim 5, wherein the trace input extends to a portion of an image presented on a touch sensitive display.

8. The method of claim 1, wherein the identification information enables a plurality of users to be identified.

9. The method of claim 1, wherein the information transmitted to the remote server is transmitted in response to the receipt of the identification information.

10. An apparatus comprising:
    at least one processor; and
    at least one memory including computer program code for one or more programs,
    the at least one memory and the computer program code configured to, with the at least one processor, cause the apparatus to perform at least the following,
       determine to detect a user input at the apparatus and, in response to the detection of the user input, select content that is stored at a remote server;
       determine to establish a communication link with a second apparatus, wherein the second apparatus is different from the apparatus;
       cause, at least in part, transmission over the established communication link of information indicative of a location of the selected stored content to the second apparatus;
       cause, at least in part, transmission over the established communication link of identification information that enables at least a user of the second apparatus to be identified to the apparatus; and
       cause, at least in part, transmission of information to the remote server to enable the user associated with the received identification information to access the selected stored content.

11. The apparatus of claim 10, wherein the communication link with the second apparatus is established in response to the detection of the user input.

12. The apparatus of claim 10, wherein the communication link with the second apparatus is a wireless communication link.

13. The apparatus of claim 10, wherein the communication link with the second apparatus is a short range wireless communication link.

14. The apparatus of claim 10, wherein the user input is a trace input on a touch sensitive user input device.

15. The apparatus of claim 14, wherein the trace input extends to an edge of the touch sensitive user input device.

16. The apparatus of claim 15, wherein the touch sensitive user input device comprises a touch sensitive display.

17. The apparatus of claim 10, wherein the identification information enables a plurality of users to be identified.

18. The apparatus of claim 10, wherein the information transmitted to the remote server is transmitted in response to the receipt of the identification information.

19. A non-transitory computer-readable storage medium carrying one or more sequences of one or more instructions which, when executed by one or more processors, cause an apparatus to at least perform the following steps:
   determining to detect a user input at the apparatus and, in response to the detection of the user input, select content that is stored at a remote server;
   determining to establish a communication link with a second apparatus wherein the second apparatus is different from the apparatus;
   causing, at least in part, transmission of information indicative of a location of the selected stored content over an established communication link to the second apparatus;
   causing, at least in part, transmission over the established communication link of identification information that enables at least a user of the second apparatus to be identified to the apparatus; and
   causing, at least in part, transmission of information to the remote server to enable the user associated with the received identification information to access the selected stored content.

20. The method of claim 7, wherein the portion of the image comprises one or more faces of potential users of the second apparatus.

* * * * *